US011171792B2

(12) United States Patent
Maccini et al.

(10) Patent No.: US 11,171,792 B2
(45) Date of Patent: **\*Nov. 9, 2021**

(54) METHOD AND SYSTEM FOR MEDIA, ADVERTISING AND/OR IN VEHICLE CONTENT MONITORING

(71) Applicant: Drive Time Metrics, Inc., Jamestown, RI (US)

(72) Inventors: Robert J. Maccini, Jamestown, RI (US); Roderick MacKenzie, Ft. Lauderdale, FL (US); Joseph V. Gallagher, Newport, RI (US); Rafael Saavedra, Sunnyvale, CA (US); Peter Williams, Belmont, CA (US); Robert M Favre, Scituate, MA (US)

(73) Assignee: Drive Time Metrics, Inc., Jamestown, RI (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/675,462

(22) Filed: Nov. 6, 2019

(65) Prior Publication Data

US 2020/0134671 A1 Apr. 30, 2020

Related U.S. Application Data

(63) Continuation-in-part of application No. 16/391,858, filed on Apr. 23, 2019, now Pat. No. 10,530,877,
(Continued)

(51) Int. Cl.
*H04L 9/32* (2006.01)
*G06F 16/29* (2019.01)
(Continued)

(52) U.S. Cl.
CPC ............ *H04L 9/3257* (2013.01); *G06F 16/29* (2019.01); *H04L 9/0643* (2013.01); *H04W 4/40* (2018.02);
(Continued)

(58) Field of Classification Search
CPC ...... G06F 16/29; H04L 9/0643; H04L 9/3257; H04L 2209/38; H04L 2209/42;
(Continued)

(56) References Cited

U.S. PATENT DOCUMENTS 5,896,554 A 4/1999 Itoh et al.
7,359,687 B2 4/2008 Ceresoli et al.
(Continued)

FOREIGN PATENT DOCUMENTS

CA 2441373 A1 3/2005
CN 203119912 U 8/2013

OTHER PUBLICATIONS

Media Rating Council accredited service providers—http://www.mediaratingcouncil.org/Accredited%20Services.htm May 1, 2014.

*Primary Examiner* — Gil H. Lee
(74) *Attorney, Agent, or Firm* — Barlow, Josephs & Holmes, Ltd.; David R. Josephs

(57) ABSTRACT

A method for reporting in vehicle media consumption and user interaction with a vehicle. The method including receiving raw data of media and vehicle usage of a vehicle by a platform device, the platform device including storage, operation controls, a microprocessor, a memory component, I/O inputs and outputs and an operating system installed and running thereon; processing the raw data to remove at least one obfuscation function to anonymize at least a portion of a personally identifiable information; and producing a report with the processed raw data relating to the user interaction vehicle and the media content.

21 Claims, 5 Drawing Sheets

Related U.S. Application Data which is a continuation-in-part of application No. 16/261,691, filed on Jan. 30, 2019, now Pat. No. 10,523,772, which is a continuation-in-part of application No. 16/180,173, filed on Nov. 5, 2018, now Pat. No. 10,523,351, which is a continuation-in-part of application No. 14/872,497, filed on Oct. 1, 2015, now Pat. No. 10,165,070.

(60) Provisional application No. 62/059,420, filed on Oct. 3, 2014.

(51) Int. Cl.
| | |
|---|---|
| *H04L 9/06* | (2006.01) |
| *H04W 4/44* | (2018.01) |
| *H04W 12/02* | (2009.01) |
| *H04W 4/40* | (2018.01) |
| *H04W 4/029* | (2018.01) |

(52) U.S. Cl.
CPC ............ *H04W 4/44* (2018.02); *H04W 12/02* (2013.01); *H04L 2209/38* (2013.01); *H04L 2209/42* (2013.01); *H04L 2209/84* (2013.01); *H04W 4/029* (2018.02)

(58) Field of Classification Search
CPC .... H04L 2209/84; H04W 4/029; H04W 4/40; H04W 4/44; H04W 12/02
See application file for complete search history.

(56) References Cited

U.S. PATENT DOCUMENTS

| | | | |
|---|---|---|---|
| 7,486,925 | B2 | 2/2009 | Breen |
| 7,584,484 | B2 | 9/2009 | Headley et al. |
| 8,549,552 | B2 | 10/2013 | Ramaswamy et al. |
| 8,666,303 | B2 | 2/2014 | Ramaswamy et al. |
| 2002/0091848 | A1 | 7/2002 | Agresta et al. |
| 2003/0216120 | A1 | 11/2003 | Ceresoli et al. |
| 2005/0221774 | A1* | 10/2005 | Ceresoli ................ H04H 60/64 455/152.1 |
| 2005/0258942 | A1* | 11/2005 | Manasseh ............... G07C 5/008 340/425.5 |
| 2006/0105702 | A1 | 5/2006 | Muth et al. |
| 2006/0206582 | A1 | 9/2006 | Finn |
| 2010/0131642 | A1* | 5/2010 | Chalikouras ....... G06Q 30/0241 709/224 |
| 2010/0257052 | A1 | 10/2010 | Zito et al. |
| 2011/0010435 | A1 | 1/2011 | Okaya et al. |
| 2011/0066667 | A1* | 3/2011 | Peeters .................. G06F 16/58 707/822 |
| 2011/0103595 | A1* | 5/2011 | Ramaswamy ......... H04R 29/00 381/56 |
| 2012/0265617 | A1 | 10/2012 | Reynolds |
| 2014/0073236 | A1 | 3/2014 | Iyer |
| 2014/0160667 | A1* | 6/2014 | Van Velzen ............ G11B 19/02 361/679.41 |
| 2018/0307859 | A1* | 10/2018 | LaFever ................ G16H 10/60 |
| 2019/0158492 | A1* | 5/2019 | Zavesky ............... G06F 16/951 |

\* cited by examiner

METHOD AND SYSTEM FOR MEDIA, ADVERTISING AND/OR IN VEHICLE CONTENT MONITORING

CROSS REFERENCE TO RELATED APPLICATION

This application is a continuation-in-part of and claims priority from earlier filed U.S. patent application Ser. No. 16/391,858, filed on Apr. 23, 2019, which is a continuation-in-part of and claims priority from earlier filed U.S. patent application Ser. No. 16/261,691, filed on Jan. 30, 2019, which is a continuation-in-part of and claims priority from earlier filed U.S. patent application Ser. No. 16/180,173, filed on Nov. 5, 2018, which is a continuation-in-part of earlier filed U.S. patent application Ser. No. 14/872,497, filed Oct. 1, 2015, now U.S. Pat. No. 10,165,070, which claims benefit to U.S. Provisional Patent Application Ser. No. 62/059,420, filed Oct. 3, 2014, the entire contents thereof are each incorporated herein by reference.

BACKGROUND OF THE INVENTION

Research studies in the media industry typically, and consistently, indicate that more than 50% of radio listening is done in a vehicle, such as a car, and further that more than 50% of all audio listening occurs in such a vehicle. However, today there does not exist any ability to actually measure and effectively analyze what people are really listening to, or watching, while in a vehicle—with accurate time and/or location data tied to a distributed ledger. Moreover, the need to tie such metrics with location data presents significant challenges while respecting the need of users to protect their identity including home and work addresses. Further still, a need remains for analyzing such raw data collected from vehicles, and other sources, into actionable data reports for any type of stakeholders.

At the outset, measurement and analysis of media consumption while in a vehicle is important to multiple stakeholders, such as: 1) radio (and other content) advertising businesses to support the buying/selling and pricing of advertising (the US market for radio advertising alone being valued at $17 billion in 2013); 2) radio station owners and programming managers to guide their selection of programming and on-air talent; 3) the music industry to gauge public reaction to artists and their work; 4) the automotive industry to understand the behavior of their customers while in their vehicles; 5) and any other entity that may be interested in the measurement and analysis of such media consumption.

There have been many attempts in the prior art to generate estimates of the use of in-vehicle audio content. For example, Nielsen Audio, previously Arbitron, provides a service to estimate the audience of AM/FM radio stations, which is primarily based on periodic survey methodologies using samples. These include use of logbook/diaries, which are manually filled out by a limited sample of selected participants, and the use of specialized devices such as Nielsen's "Portable People Meter" or PPM. A PPM is a small device worn or carried by selected participants which identifies any AM/FM radio stations in earshot of the participant from identification signals embedded in each individual radio station broadcast. Other approaches have involved the use of expensive specialized measurement equipment added to a sample number of vehicles.

However, these existing prior art methods have many disadvantages and problems. As a result, these estimation methodologies are considered to be outdated and inadequate to meet the current needs of stakeholders because they, for example, suffer from: 1) small participant sample size; 2) high cost of gathering data in this manner; 3) potential for the statistical integrity of the approach to be compromised (whether unintentionally or fraudulently) by the participants; 4) infrequent periodic timing (only several times per year) with significant lag time between survey and report availability, thus not providing the potential for real-time monitoring and analysis desired by the industry; 5) lack of ability to comparatively measure "cross channel" audio consumption (e.g. AM/FM radio vs. SDARS vs. Internet Radio, etc.); 6) the lack of ability to measure all types of media consumption (e.g. audio, video, etc.); and at least 7) the lack of the ability to ensure the integrity of the data by immutability tying such data to a distributed ledger schema.

Despite the foregoing limitations in the methodology used, Nielsen still generated more than $450 M from the sale of AM/FM radio measurement data for the US market in 2013 as no viable alternative rating source data is available. Nielsen utilizes panels of selected participants where they ask questions regarding audio usage and then extrapolates to the population. Nielsen also utilizes a PPM (portable people meter) which is a small metering device that is carried by a small group of people which listens to what audio is around them and can identify what stations are playing based on code that is, embedded in a station's broadcast, to measure FM and AM radio. This too is a sample. As another prior art example, Triton Digital measures Internet radio listening utilizing server logs for each station/channel. Typically, each individual channel has access to this information as well from their content delivery network. In a further example, SiriusXM is not able to measure what channels its subscribers are listening to as it is primarily a one-way broadcast via satellites, In view of the above, there is currently no comprehensive source of data for the accurate measurement of the full spectrum of media content that is actually consumed in an automobile, or the full spectrum of user actions with the vehicle and measured by any means. The foregoing attempts in the prior art fail to meet the needs of the industry, and the various stakeholders thereof. There exists significant industry demand, from the stakeholders identified above, for a more comprehensive in-vehicle media consumption and use measurement system that can provide greater accuracy, finer granularity and real-time measurement/analysis of media content consumption across all applicable sources—such a system does not exist today.

To meet industry expectations, there is a need for such a system to be able to continuously provide measurement data in real-time and with a high degree of geographic location accuracy. A large sample size is also a pre-requisite of achieving this requirement.

Still further, having developed a system and methodology to actually measure the media content, including audio and video, consumed in a vehicle, there is also a demand for a differentiation between multiple users of the vehicle (e.g. members of the same family). This includes contextual analysis of how media consumption may differ with situation (e.g. a mother or father may primarily listen to adult news and music content during their commute while alone in the car but might listen to kids' channels whenever their children are in the car). This can further include the delivery of raw data to a third party organization, or the OEM or other users, to convert it into useful media analytics and metrics.

Further still, the instant system and methodology allows for the measurement of data, audio, and video as well as other content delivered to a vehicle. For example, a vehicle can receive a display ad, coupon, cryptographic token, audio, video or other content relating to a fast food restaurant. Using data associated with what is being broadcast/transmitted to the vehicle as well as location data from the system, the instant method and system can determine whether the vehicle took an action, e.g. drove to the store or accessed a website, saved the information for later, etc. This analysis is also known as ad attribution. Comparing the activity of vehicles that viewed/heard an ad to the vehicles that did not view/hear the ad results in the ability to measure video store ad conversion rates, number of store visits, advertising lift and ad cost per store visit. Combining this data with consumer store spending data leads to a value per vehicle visit. Using GPS location data derived from the vehicle the system can develop driving patterns, store visit locations, and visited store types which comprise valuable intelligence for retailers. Such intelligence may include, for example, metrics describing the frequency, timing, number and type of visits/occurrences, repeating patterns, financial and other value exchange, redemptions, purchase analytics and the like. The impact may be measured using a variety of methods such as including both quantative and qualitative, as are typically employed in analysis of advertising, promotion and marketing campaigns, such as conversion factors, upsell analytics, engagement metrics (such as time in store) and the like which are well known in the art. Over time, visitation trends and macro and micro level events affecting real world behavior can be determined. Combining vehicle location data with consumer demographics, mobile devices and app usage delivers the most accurate ad targeting capability.

In addition to the aforementioned benefits, the instant system and methodology allows for the acknowledgement that information received from a vehicle entertainment system is partial in nature, in that such information does not convey the context of the experience of a vehicle's occupants for a media event. The combination of verifiable proof of performance, through accurate time and location alignment combined with multiple media sources and contextual information provides a rich, accurate and immutable record of a vehicles occupants experiences. The information sets for traditional methods, center on a single source, a vehicle's inbuilt radio, whereas modern vehicles today include entertainment systems that support, radio, other hard media such as CD, USB and the like and connected sources such as embedded wireless modems and smart phones. Even the purveyors of systems that track podcasts, one of the most rapidly growing media sources of today, state that listening behavior cannot be monitored.

Alternatively, or additionally, the use of an immutable repository, such as a distributed ledger, to record the timing and location information is complemented by the use of cryptographically bound containers, which span a period of time, with a granularity that can differ from the underlying blocks of the distributed ledger to provide further benefits over the prior art systems.

Moreover, in general, there is a natural tension between a user and the advertiser as to the degree of information to be collected by an advertiser or their proxy. This collection is often mediated by at least one stakeholder involved in content delivery, for example a broadcaster, advertiser, vehicle OEM, information aggregator or other interested party. The information collected may be used for a wide range of purposes, including attribution of advertising, pricing of advertising, analysis of behaviors related to content, audience measurement and other metrics, pattern based behaviors, location analytics and other analytics.

Data collected from the vehicle represents a set of raw variables that must be operated upon in order to convert it into useful media analytics and metrics. Typically, a vehicle can provide information that will identify a source of content (AM, FM, satellite, PANDORA, SPOTIFY, IHEART, etc.). These content delivery methods may be considered as two groups, those delivered by traditional broadcast, through RF and Satellite and those delivered over similar mediums but using an IP protocol (Internet). As vehicles include additional communications technologies, including 4G and 5G radio based IP systems, the potential content sources in a vehicle increases significantly. Some vehicles may also include render systems that support connection of a vehicles occupant's individual devices. The range of information that can be generated by a vehicle regarding the content being consumed by the occupants can be extensive. Each of the technology sets employed to deliver content has associated information sets that may be used to evaluate consumption behaviors and habits. These behaviors and habits are often tied to unique individual users and content providers, or advertisers, will often seek out as much information about the user as possible to develop accurate and well-rounded profiles of the user. Prior art systems and methods suffer from the ability to provide content providers, or advertisers, with usable data that is tied to geographic data of the user without compromising the user's privacy concerns.

The foregoing attempts in the prior art fail to meet the needs of the industry, and the various stakeholders thereof. There exists significant industry demand, from the stakeholders identified above, for a more comprehensive in-vehicle media consumption measurement and delivery system that can provide greater accuracy, finer granularity and real-time measurement/analysis of media content consumption across all applicable sources, all while accurately protecting the users personal information—such a system does not exist today.

SUMMARY OF THE INVENTION

The present invention preserves and improves the advantages of prior art monitoring, listening, and reporting systems and methods for in vehicle media, including audio, video, local, and web-based applications and games, and other media types and vehicle usage in general. In addition, it provides new advantages not found in currently available systems and methods and overcomes many disadvantages of such currently available systems and methods.

The invention, in one exemplary embodiment may include an application resident on a user's device, which when they have opted in and agreed to the operation of the application, may provide information sets to the platform. These information sets may, in whole or in part be encrypted, either by the application or the platform, to protect the user's identity, and yet yield sufficient information to undertake analysis of the information to produce the measurements and metrics described herein.

The invention meets the above-identified needs by providing a system, apparatus, method and computer software for obtaining, measuring and analyzing in real-time (or on such other basis that can be configured) all forms of media content that a driver or passenger may consume inside of an automobile in combination with a reference time base and a reference location base, both of which are immutably recorded in a form that can be independently verified. This includes, but is not limited to, AM/FM radio, Satellite Digital Audio Radio Service (SDARS), stored media such as CDs, MP3s, DVDs and MP4s, content streaming, internet radio, audio books, podcasts, text-to-speech content and other forms of content, including content routed to the In Vehicle Entertainment (WE) system through integration with a smartphone, MP3 player, DVD/Blu-ray player, game console or other similar external Consumer Electronic (CE) device (via wired or wireless connectivity, including but not limited to USB, BLUETOOTH, Wi-Fi, etc.). The combination of an accurate time reference, and accurate location reference and multiple sources of information, which is represented by an event generated initially in real time, provides a unique insight into the multifaceted behaviors of vehicle occupants as they undertake journeys and are exposed to multiple sources of content. The instant system and methods additionally provide for means to make individual users anonymous, including personally identifiable information and identifiable location information.

Also important is the invention's ability to provide real-time dynamic measurement of in-vehicle media consumption (compared to the extensive lag time between survey and report of the existing methodologies) through any means. Alternatively, the system can permit for real-time or periodic monitoring of the use of audio, video, display content and related data in a vehicle, via software installed in the head unit of a vehicle along with hardware to receive the data, audio and video signals/channels.

The instant invention provides for means to deliver raw data, as well as measurement data and analysis to auto manufacturing companies, providers of media content (including those available currently and others that may be available in the future), advertising companies, platforms and agencies, the music industry and other interested parties.

One objective of the invention is to measure all applicable forms of media consumption in an automobile and to provide an immutable record of the time and location data associated with some or all of the measurements. This consumption will represent actual measured data rather than mere survey data (which is the only data available today). The actual measured data can then be delivered to end users to convert it into useful media analytics and metrics.

Actual measurement and analysis of what media people consume while in a vehicle, and/or the vehicle usage, is important to multiple stakeholders, who are currently underserved by existing measurement services based on survey methodologies, including (but not limited to: 1) radio, television (and other content) advertising businesses to support the buying/selling and pricing of content advertising (the US market for radio advertising is valued at $17 billion in 2017 and television advertising revenue of $70 billion); 2) radio and television station owners and programming managers to guide their selection of programming and on-air talent; 3) the music industry and video production companies to gauge public reaction to artists and their work; 4) the automotive industry to understand the behavior of their customers; and 5) and any other entity that may be interested in the measurement and analysis of such media consumption.

These, and other, objectives are understood to be encompassed in the following detailed description.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
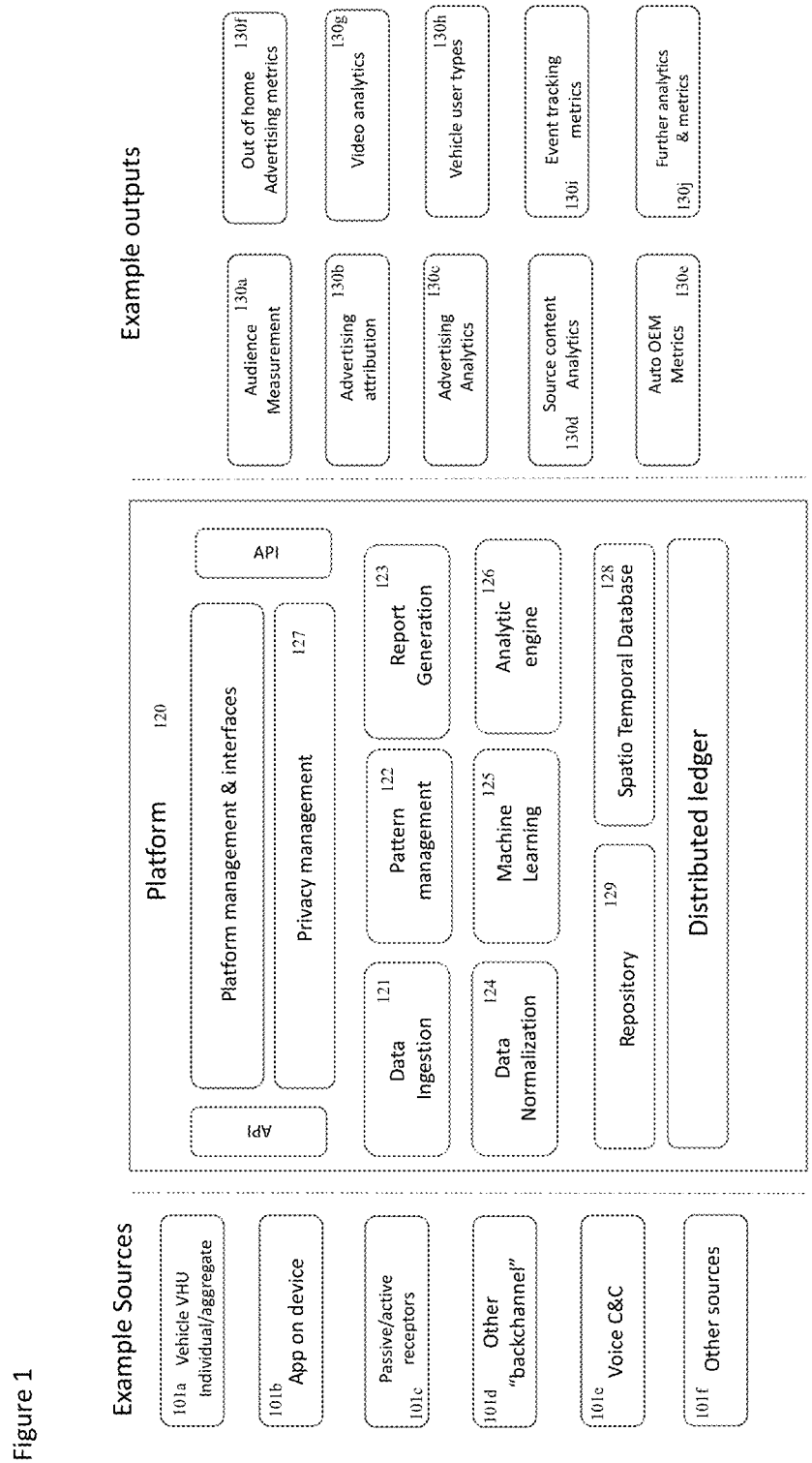
FIG. 1 is a block diagram of a platform according to one embodiment.

The invention is generally directed to the novel and unique system and method for in-car media consumption measurement and analysis. As generally shown in FIG. 1, an embodiment of the overall system configuration is illustrated. In general, input sources 101a, 101b, 101c, 101d, 101e, and 101f, or any number of input sources can be received by a platform 120 which can process such information to produce actionable outputs 130a-j. In some embodiments, the input sources can generally include information from a vehicle head unit 101a, an application on a device 101b, passive or active receptors 101c, other back-channel sources of information 101d, voice command and control 101e, or other sources 101f. The platform 120 can include any number of various modules and APIs, some of which are discussed herein, to generate reports, determine patterns, manage privacy of the users, and apply the data to a distributed ledger. The platform 120 is capable of generating various types of outputs, including audience measurement 130a, advertising attribution 130b, advertising analytics 130c, source content analytics 130d, auto OEM metrics 130e, out of home advertising metrics 130f, video analytics 130g, vehicle user types 130h, event tracking metrics 130i, and/or other metrics analytics and metrics 130j. Thus, an adaptive platform 120 is provided which can receive data from a variety of sources, tie such data to an immutable record, process such data, and produce actionable output data sets 130a-j.

As discussed above, there exists a natural tension between users, i.e. drivers, and the advertiser as to the degree of information to be collected by an advertiser or their proxy. This collection is often mediated by at least one stakeholder involved in content delivery, for example a broadcaster, advertiser, vehicle OEM, information aggregator or other interested party. The information collected may be used for a wide range of purposes, including attribution of advertising, pricing of advertising, analysis of behaviors related to content, audience measurement and other metrics, pattern based behaviors, location analytics and other analytics. The data that is collected from a particular vehicle can be utilized for any number of applications, including those outlined below.

Data collected from the various sources 101a-f can represent a set of raw variables that must be operated upon, by the instant platform 120 for example, in order to convert into useful media analytics and metrics. Typically, a vehicle, or other device, can provide information that will identify a source of content (AM, FM, satellite, PANDORA, SPOTIFY, IHEART, etc.). These content delivery methods may be classified into two groups, 1) those delivered by traditional broadcast, through RF and Satellite and 2) those delivered over similar mediums but using an IP protocol (Internet). As vehicles include additional communications technologies, including 4G and 5G radio based IP systems, the potential content sources in a vehicle increases significantly. Some vehicles may also include render computer systems that support connection of a vehicles occupant's individual devices. The range of information that can be generated by a vehicle regarding the content being consumed by the occupants can be extensive. Each of the technology sets employed to deliver content can have associated information sets that may be used to evaluate consumption behaviors and habits.

In the case of AM or FM band, the data set can also include a frequency. The available frequencies, in the U. S., are designated by the Federal Communications Commission or another sovereign issuing authority and assigned to radio stations, and are re-used across markets (i.e. 103.7 in Los Angeles will be a different radio station than 103.7 in Seattle). Raw variables can also include a Universal Time Code formatted date/time stamp. UTC is the zero base time constant and must be offset to determine local time. Additional variables available from the vehicle can also include the latitude and longitude of the vehicle.

In the case of IP delivered content, the source IP address is available in addition to the type of stream being employed for the content dissemination, any meta data associated with the stream, volumetric information as to the size, duration and use of the stream and the like. IP applications often require an application that is capable of rendering that content, some of which are generally provided by a device, for example ITUNES and similar and others that are proprietary to the content provider, such as SPOTIFY, PANDORA and the like.

To create meaningful analytics and metrics for the content providers, distributers and their stakeholders, a set or raw information which may include, the source of the content, the time period over which it was consumed, any available device operations information, any available and accessible user identity information and the locations at which the content was consumed can be ingested, processed, and output to meet the needs of those content providers and their stakeholders through a platform. In some cases, the raw data can be output directly from the vehicle, or device, itself and aggregated into a data set including a large number of users by the data ingestion module 121 of the platform 120.

Such a data ingestion module 121 can include the ability to receive the raw data, ingest this information, via other modules discussed herein, and convert this information into formats, reports and representations suitable for use by the content providers, distributers and their value chain and other stakeholders, via a report generation module 123. Within this platform a series of modules may be employed to:

Normalize the input information sets to enable further evaluation, e.g. the data normalization module 124.

Manage the privacy of the sources of the information, via the privacy management module 127.

Evaluate the information using pattern matching (e.g. the pattern management module 122), behavior analytics, exception matching and other categorization, measurement, correlation and causation and other processing techniques, generally including the use of machine learning methods and configurations. A spatiotemporal database 128 may be included in the platform to achieve some of these functions, for example.

Compare the information to location based ephemera such as points of interest, roadways, commercial and residential zones, telecommunications facilities, city and county infrastructure and match to contextual information such as calendar events, weather patterns, time of day, week, season etc. and other pertinent contextual information.

Store the information in one or more repository 129, including in an immutable manner using distributed ledgers, directly and indirectly through intermediate repositories.

Figure 3:
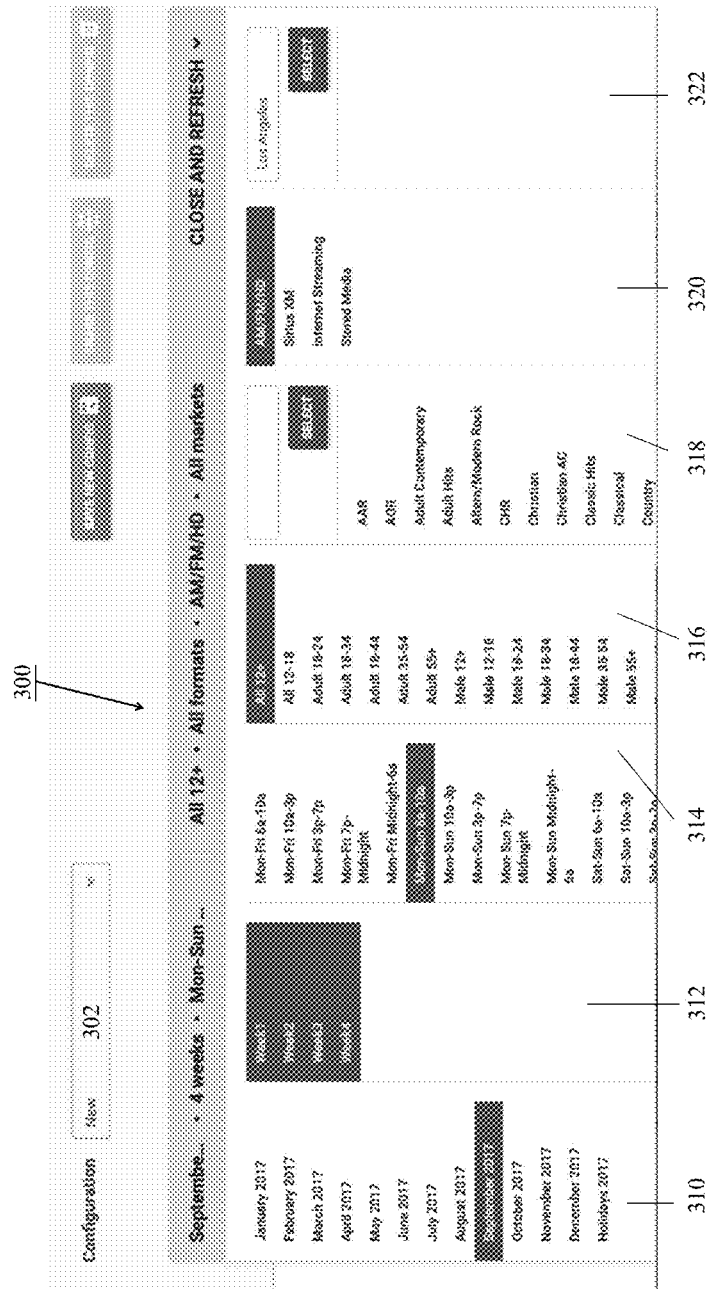
FIG. 3 is an exemplary software for report generation of the platform.

Create reports, metrics and analytics suitable for multiple stakeholders, including supporting queries and requests from those stakeholders, some of which may be dynamic in nature. As shown in FIG. 3, in one embodiment, a software 300 can be employed by a computer and displayed on a monitor or other visual device. The software can present a user with a number of options, or filters. For example, a licensee of such data may create a report configuration 302 by the selection, via online filters, certain variables 310-320 such as months 310, weeks 312, day-part 314 (e.g., Monday-Friday 6:00 am-8:00 pm), format 316, demographic group (e.g., females aged 25-54) 318, source 320 (AM/FM, satellite, PANDORA, etc.), and/or a market (e.g., Boston, Philadelphia, etc.) 322. A licensee may make use of none, some, or all of the filters when creating a given report profile 302. Based on the licensee defined variables, a report with standard audience metrics can be displayed, or outputted. Once the user has selected their desired online filters, shown as highlighted areas, the software can prepare the aforementioned reports with the standard audience metrics. In one embodiment, the input data to the system can include sanitized data received from the vehicles and/or user mobile devices, etc. The data can be sanitized to remove personally identifiable information which could compromise the identity of any one given user in the pool of data. This sanitized data may be supplemented by other data sources which may be publicly available or proprietary to the end user who is commissioning the report.

Calculate and configure information, through for example extrapolation and/or interpolation based on current information, location based ephemera (road network, vehicle physics and the like) and the like.

Such a platform 120 may employ software that is locally or remotely run on a CPU. The CPU itself can be disposed within the vehicle, on devices of users and occupants of the vehicle, on telecommunications network access points or other network system elements, on specialized hardware designed to capture either signals transmitted by content providers or as part of hardware designed to receive those signals. In a preferred embodiment, the platform is run on a CPU that is remote from the individual vehicles or data collection devices. Alternatively, the raw data can be acted upon directly in the vehicles or data collection devices. The platform may also receive information from other sources, such as aggregated information from sets of vehicles that can be configured and processed to create information sets for content providers, distributors and their stakeholders.

The platform 120 may include a software application that is loaded onto on a user's device which can require the user to opt in and agreed to the operation of the application and may provide information sets to the platform. These information sets may, in whole or in part be encrypted, either by the application or the platform, to protect the user's identity, and yet yield sufficient information to undertake analysis of the information to produce the measurements and metrics described herein. The platform may monitor content that is consumed on the device. This monitoring may be undertaken by using fingerprinting, watermarking, or other identification of content including metadata bound to the respective content. The platform may create an identifier for a device that is managed by the platform such that the identity of the device, for example the SIM or other unique identifier, is not disclosed, nor is the identity of the user of the device. If the device is connected to a head unit or other system in a vehicle which includes platform functionality, this identifier can be used to establish the identity of that device. If the application that is monitoring the content consumption, is interrupted, for example by an incoming phone call this interruption information will be passed to the platform. Other functions of the device, such as incoming messages or other events may be recognized and recorded as distractions for the user, which may have an impact on platform metrics such as "content magnetism" or engagement.

For example, in order to provide basic meaningful analytics and metrics for terrestrial radio stations, content that is consumed in the vehicle must be attributed to an individual radio station. This is made possible through the combination of source, frequency, location and date/time variables that are transmitted from the vehicle or user device.

In some use cases, it may be beneficial to look at individual radio advertising zones for user activities. Radio advertising zones can be represented as "markets." Each market can be defined as a list of census tracts or zip codes where a particular frequency may be heard. Markets can also have an assigned time zone. As such, a method must exist to place a vehicle in a market and such a method can be employed after the receipt of the raw data. The latitude and longitude variables are used to determine vehicle location for market assignation and time zone determination through the application of the proper UTC offset. Once the market and time zone have been determined, it is possible to identify the callsign of a particular station by utilizing a combination of the source and frequency variables. With the market and callsign assigned, station ownership, genre/format, transmission power and tower location can be determined utilizing $3^{rd}$ party data sources. Data provided by a terrestrial radio station or other service providers can be utilized including song title, artist, ad, etc. with exact time of airplay can be matched to each terrestrial radio station. In general, any methods of determining the raw data can be used.

The correlation of this information may include the use of a machine learning module 125, or other analytic techniques, as the third party data may need to be normalized for evaluation. A great deal of information is available from internet sources, however the timing information associated with that data may also need to be aligned with the time base of the platform. Such methods are described in detail in co-owned parent applications, such as U.S. patent application Ser. No. 16/391,858, filed on Apr. 23, 2019, which is incorporated by reference herein.

The use of clustering, heuristics, hidden markov models, Bayesian and other probability base techniques which extrapolate from at least one reliable data point, such as a time, place or name integrates the disparate data sources into an integrated data set that can be used as a basis for the analytics described herein.

Machine learning may be applied to the incoming data sets, where there may be a set of data representing an event, for example an engine start event, a time stamp, and an identifier. This data set may represent the initiation of a journey. This information set may be correlated with at least one source of information regarding the content consumed within the vehicle, where that information can be received from a vehicle head unit and/or device associated with the vehicle. The correlation and analysis of the information sets received may employ techniques such as belief propagation, to simplify the number of variables and Clique trees where common variables are present. Both of these techniques are employed when using a Bayesian network to determine exact inference. Approximate inference may also be determined. As Bayesian networks can represent conditional dependencies between variables, learning algorithms may be applied to the Bayesian structure. The use of journeys as a structure for evaluation of these data sets significantly reduces the complexity of the combinations involved.

One aspect of the system is the ability to collate information sets based on an initial start point and quantize those sets based on at least one value. Traditionally this has been done in advertising management with time, for example every 15 seconds. However, as the platform can be configured to output such industry standard reports, the capturing and management of the incoming information sets may be configured with other values. For example, an initial start point for an information sets may be an "engine start" message received form a vehicle. This vehicle, for reasons of privacy, may not have accurate, or any, time, location, vehicle identity or other identifying information associated with it. However, the platform may use this initial data to initiate a process to capture the stream of information from the vehicle and the systems therein until a corresponding "engine stop" message is received. In the case of electric or hybrid vehicles, these messages may be "system start" and "system stop" respectively.

Over the course of the journey further information may become available, including location information and timing information as well as the content information captured or derived from the content monitoring systems in the vehicle. The platform can store elapsed timings for all events based on start and end messages received. This stored elapsed timing information and the start and end messages form the framework for aligning any other information that may be integrated with this stream. For example, the program logs of the content provider may be used to align the platform timings so as to establish, with an associated metrics for accuracy and/or reliability the time of the start and end messages. This information may then be used to classify a journey, for example a morning commute, school run and the like.

Additional third party data can be appended, or added, to the media data that is collected. The additional third party data can include, but is not limited to, motor vehicle registry information, mobile phone ID, location points of interest. In some embodiments, the mobile phone ID may be captured by mobile device pairing in the vehicle or as a result of location data collected from the vehicle and matching to various services that provide mobile phone location. For example, if a vehicle turns on each day at 8 AM at the same location, the system can assume that the location is a home address. Associating one or more mobile phones to a vehicle can allow more precise analysis of the consumer controlling media selection in a vehicle. In addition, demographic, psychographic, social, and other data can be widely available based on mobile phone ID's or telephone numbers. This added data can more specifically inform users of the data allowing better targeting of content including song and ad selection. As discussed elsewhere, the data can be "sanitized" to remove all or a portion of the personally identifiable information from the data set. This can be accomplished with the use of an identifier proxy with known degrees of certainty.

As a result, a holistic profile of a vehicle can be developed based on the foregoing data. Audio listening characteristics can be assigned to a particular vehicle via "snapshot" or "event driven" data collection that constantly update the vehicle profile.

By collecting and ingesting vehicle data, including but not limited to audio source and vehicle location, road network data as well as incorporating third party data sources into the platform, a wide range of analytics of the vehicle data can be undertaken, including determining what AM/FM/HD radio station is being listened to in a vehicle and the duration of listening. The platform can support the creation, management and storage of standard audio audience metrics including the number of listening sessions, the number of listeners for any time period, the average quarter hour listening (AQH), the AQH persons, the AQH Rating, the Cumulative unique audience (CUME), the CUME persons, the CUME rating, the time spent listing (TSL), the average time spent listening (ATSL), and other generally accepted industry analytics can be generated. In this manner, stations/channels can be ranked based on any of the foregoing metrics.

The platform can provide for an application programming interface (API) for interactions with users of that information, and where appropriate can provide such users with immutable records of the underlying information sets from which the analytics have been generated. Such platform user access can be controlled and managed with authentication, authorization, and access management techniques to ensure the security of the information and those interacting with it.

For example, the API can use "generic" or customized authentication, authorization and access control approaches based on industry best practices. This may include source authentications whereby the information set originating from a device, vehicle, user of location that is sufficiently uniquely identified may be accessed by that originating party, or their authorized proxy, to verify what information was ingested into the platform. The API functionality can include controlled access to measurements and aggregates resulting from the data processing, to normalized input data, to data in different states of processing along the analytics pipeline (such as individual or aggregated data, matched with or classified according to external data such as market or population areas, specific data sources or content programming, specific demographics and so on). One aspect of the API is the separation of the data and the methods applied, such that a user of the API can interact with each independently. For example, an end user of the platform can request only a basic report, request the sanitized, or anonymized, data, incorporate added data to the raw data sets, or use the methods or tools of the API with their own data sets. In effect, the end user may use the data, API's, or both of the platform.

In addition, other criteria can be added to the raw data sets including the month, the week, the day (or other custom periods of time), the time of day (day part) such as 6 AM-10 AM, 6 AM-Midnight, etc., demographic information such as Male 18-34, Female 55+, etc., station format, radio market, ethnicity, income levels, education levels, and other demographic or psychographic metrics.

The forgoing metrics can be calculated for syndicated radio shows, podcasts, and for other media sources such as SIRIUSXM, Internet radio providers such as PANDORA, SPOTIFY, APPLE MUSIC, AMAZON MUSIC and others. The platform can allow for a holistic view and measurement of media consumption including audio listening and video consumption in the vehicle. Vehicle media/audio profiles can be developed and segments created based on listening preference and other criteria outlined above. For example, occupants of the vehicle spend 40% of time listening to country music, 40% with NPR content and 20% to News/Talk Stations. In some embodiments the profile can include, for example, occupants of the vehicle spend 60% of their time with AM/FM/HD radio and 40% of their time with SIRIUSXM.

Utilizing location data from the vehicle, the platform can identify a home census track or home location to provide anonymized demographic, ethnicity, income levels, educations levels and the like. This data can include mobile phone information which may be used to obtained even more detailed demographic and other data associated with listeners that may from time to time be present in a vehicle rather than assigning listening just to a vehicle without knowing the consumer responsible for media selection.

Listening data can be reported and analyzed in real time or on a historical basis. For one to one content, e.g. internet radio, this data can be used to target content including advertising to listeners. For example, a listener that is within a certain distance of an advertiser's location or has visited an advertiser location in the past, can be specifically targeted.

The data can be used by the instant platform to match the drivers, their profiles (identified preferences, demographics, journey patterns), and their current context (current location or journey, currently active media source, time of day, day of week, date, traffic conditions, and so on) with advertisers campaigns, enabling methods similar to programmatic advertising, used in web environments for fully automated and individualized purchase and sale of advertising space in real time.

The forgoing analytics can be used by content sources to improve their content output and appeal to a wider audience. Importantly, the analytics can be used to form the basis for projecting the reach and number of impressions generated by advertising run on any station or groups of stations in a market or nationally. Additionally, such content improvement may include increasing engagement with specific targeted audiences, especially those served by internet content delivery. For example, if historically a station has reached 1,000 people Monday-Friday 6 AM-10 AM, then a station and advertisers can utilize this historical data to project how many people will be reached if an ad runs during those same periods.

The use of classification techniques where the types of journeys are already classified, at least in part, by the time of day that they occur, their duration, their location information (where available) and their relationships to known points of interest such as infrastructure (bridges, tunnels, road intersections and the like), commercial premises (particularly those associated with current, past or future advertisers), and the like provides classification schemas that can support a degree of segmentation, accuracy and insight that has to date been unavailable. For example, morning or evening commute, school run, shopping run or other regular and repeated journey types as well those journeys that do not meet these criteria, such as a specific journey to a location that is not part of the recognized pattern for a vehicle, device or where appropriate user, and sets thereof. Included in the analytics is detailed information as to the consumption of the content, such as channel switching, length of engagement, distractions and other valuable insights as to the effectiveness of the content.

The content may additionally include targeted advertising based on known user behaviors, such as when a user is approaching the home, or work, a regular drop off, such as school or similar and/or at specific times, such as when an aggregation of vehicles is stationary on a road network and the like.

The platform can also address one of AM/FM/HD's, or satellite radio or other broadcasting methods, primary problems of quantifying the actual delivery of an ad. Since terrestrial radio is a service that is one-way delivery, there currently there are no return paths to determine if a song, ad, or program was listened to. This ability exists in digital media, putting terrestrial broadcasting radio at a disadvantage. For example, with the invention the platform can determine how many vehicles actually heard the ad (i.e. the ad was played at the time a listener was tuned to that particular station or source). The platform can determine how many vehicles heard the ad by means of a vehicle head unit, user's personal device, or other devices capable of making such a determination.

In some embodiments, the determination of how many vehicles heard the can be achieved through direct and indirect recognition of the content being heard in a vehicle by the occupants, for example through matched time reporting of the program and advertising broadcast and data set representing the settings of the controls on the in vehicle render systems. The information set may include multiple sources, including but not limited to, vehicle head unit, vehicle content render systems, content broadcaster program logs, device content recognition applications, vehicle voice instruction systems, devices operated by voice command, OEM provided logs, vehicle sensors, meta data files and other sources of information. In this manner, data that is captured by the platform can be attributed to at least one user, where the content was consumed by at least one device in a vehicle. This may include situations where the identity of the specific vehicle, device, user, location, time or other variable may be unknown or known only in part, however, consumption may be confirmed through multiple sources contributing to the dataset.

In some embodiments, the system and methodology can be configured for the use of the analysis of advertising and its effectiveness, otherwise called ad-attribution. The platform may be used to determine the return on investment for an advertiser (or its ad agency) on its advertising campaign as well as the advertising campaign's effectiveness. Ad attribution metrics, measuring whether consumers engaged in the desired behavior due to hearing or seeing an ad played in a vehicle, is one such application of the invention. Assessing whether the consumer drove to the advertiser's store or accessed the advertiser's website due to hearing or seeing an ad utilizing a vehicles geographic location is a basis for advertisers and ad agencies to measure the effectiveness of an advertising campaign. The geographic location and exact time stamp of content such as an ad can be derived from the platform and may be cross referenced with data from programming logs of audio sources such as AM/FM radio stations, internet radio channels and satellite radio channels or other content sources and metadata derived from the invention.

For example, the number of store visits, represented in the platform as points of interest, can be generated by vehicles/consumers that are exposed to the ad, can be compared to visits for vehicles/consumers not exposed to the ad. Thus, the platform can derive ad effectiveness or an advertising lift metric. In this or an alternative use, such points of interest, such as a retailer of a product advertised, can be made aware of such a lift and adjust their stock levels, or create an appropriate offer (for example buy one and get 20% off the second) for the product or service being advertised. A return on investment of an advertising campaign can be computed by comparing the cost of the advertising campaign relative to the number of store visits, and by calculating the total monetary value of what the vehicle owner/consumer actually spent at the store as a result of the advertising heard in the vehicle. Examining the impact of advertising delivered to a vehicle may include, but is not be limited to: (i) the impact of different ad creative copy, content, ad length and other ad factors on vehicle/consumer behavior (ii) impact on different demographic groups of vehicle owners and drivers, (iii) the impact of advertising at different times of day, (iv) the impact of advertising in comparison to listener activity/store visits prior to and post advertising campaign run dates, (v) impact based on prior vehicle behavior and advertiser brand preferences, (vi) determining whether an ad was heard or seen in a vehicle, (vii) real time analysis, tracking and ad delivery, (viii) segmenting vehicles based on prior behavior including which stores frequented, (ix) assessment of the effectiveness of the content being delivered, or (x) assessment of the sequence of advertisements delivered and the like.

In such examples, information regarding the content, time, location, identifiers associated with a vehicle, user and/or device may contribute, to the generation of exposure and/or attribution metrics, including those created in real time or near real time. At least one of the information sets can be communicated to the platform in real time, such that feedback to a stakeholder, e.g., a store, advertiser, content provider, may be provided to them in an actionable format.

Associating an audio, or video, ad file with listener behavior can be utilized by advertisers, agencies and others to better develop ad copy and content appealing to consumers including allowing better targeted advertising to listeners and viewers. The audio and/or video file of an ad can be overlaid with actual listener/viewer tune-in and tune-out data to create a metric such as "ad magnetism." Ad magnetism can be understood as an engagement measure of listener likelihood of listening to a specific ad or brand message and potentially the ideal duration for such. Overall ad listening/viewing duration can be measured for an advertising campaign. Ad listening/viewing duration and magnetism can be combined to score advertising campaigns and increased future ad campaign listening completion rates. This data can also assist in better targeting ads to consumers. The foregoing also can be measured by results recorded in ad attribution conversion rates outlined above. These metrics can be generated by the platform based on the information received from at least one device in a vehicle. This vehicle device provided information may be correlated with other sources, based on time, location, content or other informing aspects to create ad magnetism and/or other metrics expressing a user's consumption of an ad and the message therein.

The forgoing analysis outlined above, with respect to the ad analytics, can also be provided for music and spoken word programming such as news and podcasting, or for syndicated radio shows, or any audio or video content. Utilizing metadata obtained from vehicle data such as song title, show name, artist, etc. and/or from matching the timestamp of content played from a vehicle with third party data such as station log files (obtained from the station or their service providers such as WIDEORBIT, MARKETRON, etc.) the invention can measure song magnetism, tune in/tune out and completion rates (e.g., whether 100%, or what portion thereof, was heard). This data, as well as listening patterns across different days and time periods, can be calculated and utilized to improve future programming.

The platform can be configured to ascertain and normalize time stamps of data sets received so as to have an accurate time for transmission, reception and consumption. This may include of machine learning and other probability based techniques as previously disclosed. A distributed ledger may be used to store the time stamp and other information to provide an immutable record of the event. The time stamp information may include or be bound to the data concerning the content, from the vehicle and other sources providing an accurate and reliable record of the listener/viewer behaviors. Such methods are described in detail in co-owned application U.S. patent application Ser. No. 16/391,858, hereby incorporate by reference.

The song titles/show names, artists/labels and other rankers can be developed across all listening/viewer sources or individual listening/viewing sources, e.g. top songs on AM/FM/HD, top artists on SIRIUSXM, etc. The same analysis can be provided for radio shows such as RUSH LIMBAUGH, HOWARD STERN, THE TODAY SHOW, CNN NEWS, CBS TV, NBC TV, ABC TV, etc. For example, an audio, or other content, source may be ranked by the number of listeners during a specific time period or by a demographic group (e.g., Males aged 18-34, Females aged 25-54, etc.). Songs may be ranked based on the number of listeners that heard the song for a specific time period and on other variables.

Rankings may be determined in response to multiple sets of variables and analytics that are determined by the vehicle occupants' responses to content delivered to the vehicle. For example, songs may be ranked based on the degree of volume change, increase or decrease, or a segment on a radio station may be ranked according to the volume relative to other segments, or the number of channel changes to receive or avoid a particular segment. Custom analytics can be created in response to broadcaster or advertiser demand, based on occupant responses to content. Alternatively, or in addition, rankings may be based, for example, on time played, volume (loudness) of content, quantity of occurrences, quality metrics (such as direct or indirect occupant satisfaction metrics), number, timing and types of channel/program changes, repetitive patterns (of both selection and avoidance) and the like.

In another alternative, or additional, embodiment, the platform can be utilized by auto original equipment manufacturers (OEMs) in their development of future vehicle infotainment systems including reduction in costs or broader appeal to consumers thereby increasing their vehicles sales. For example, many auto OEMs still include an CD player in the infotainment system package. The invention can determine, at scale, what percentage of vehicles access the CD player and how much time is spent utilizing the CD player. Should this amount be found to be quite small it may allow for the removal of the CD player thereby lowering costs. One of the key elements influencing consumer vehicle purchase is the infotainment system. Some of these influencing elements can include: the ease of connecting BLUETOOTH wireless devices, the selection of audio sources via touch screen or physical control, and/or the availability of ANDROID AUTO or APPLE CARPLAY. The degree of use of, and how a consumer interacts with, these and other onboard services can assess functional importance of such services.

Additionally, or alternatively, the platform can be used by auto OEMs to better understand how the vehicles are being used and by whom. Auto OEMs generally know only who buys the vehicle, and not who typically drives it—for example, a car purchased by a 50 year old male may regularly be driver by a 20 year old female (his daughter). The invention can determine the demographics of the vehicle user from their listening habits and location, or directly from the users themselves. Such demographic usage data can provide the auto OEM with powerful insights into the demographics of vehicle users and their tastes and preferences in audio, which can be used to improve marketing communications with existing and future customers. Moreover, as auto manufacturers and their dealers are among the largest audio advertisers in the U.S., information on their customer's use of certain audio/video sources can better inform their advertising purchases and assist in communication with their customer base improving customer loyalty. Such analytics, provided by the platform, can further be used by auto OEMs to create personalized entertainment and driving experiences for their customers. One example is an auto brand personalized playlist, another would be suggesting music or programming based on time of day, weather, location, traffic condition or other physical world elements.

In some embodiments, it can be beneficial to additionally measure vehicle user video consumption. With the advent of autonomous vehicles, vehicle occupants will eventually have added time to consume a wider variety and increased volume of media content, especially video or other immersive content, as there will no longer be a dedicated human driver of the vehicle. Heretofore almost all video (except for rear seat screens) has not been present in vehicles due to safety reasons. Eventually, all occupants in an autonomous vehicle will be passengers who will now have time available for entertainment or work related activities during use of the vehicle. This entertainment can include linear and non-linear video, games, both local and network, telepresence, video conferencing and the like. Each of these activities can generate data sets which can be ingested into the platform for analysis, similar to the audio data sets described above. As an autonomous vehicle will likely have a 5G or other network communications capability, large display screens and audio systems built into the vehicle, the platform may receive information from these systems, including their control operations.

In one exemplary embodiment of the platform, such information may be received from a network communications tower. As all radio communications in the frequency bands sufficient for delivery of content streams suitable for consumption in a vehicle have a limited range, these tower systems may be monitored for the number and type of streams being delivered in a specific area. The meta data of these streams can provide information sets suitable for analysis by the platform and transformation into existing and new report formats.

The access of a tower providing radio-based communications includes, cellular and internet, for example as embodied by 3G, LTE (4G), or 5G, and may include other wireless technologies, such as WiFi or similar. In some embodiments, vehicles may have fitted burst receivers that download large volumes of data when a vehicle is stationary, for example at a traffic light, using for example the 60 Ghz band. Theses towers may provide further information sets such as meta data associated with the content, number, type and identifiers of devices in communication with the towers. This may include the duration of the connection and the volume of data communicated. For example, a tower may indicate a significant throughput of data to a vehicle, for example that typically associated with a high-resolution video. The same tower may also indicate the time of a voice call to a device within a vehicle, which can be collated to in vehicle render systems, such as a hands-free voice call system.

Video signals may be delivered to the vehicle via direct broadcast by satellite, ATSC 3.0 (also known as Next Gen TV), the internet ("IP"), including 5G or successor technology, systems, and other technologies. Due to their mobility vehicles generally can only receive content delivered in real time via wireless technologies, unless the vehicle has been pre-loaded with content. For example, a vehicle OEM or operator may pre-load a vehicle with specific content that is intended to appeal to a specific audience type, for example vehicles traveling to a sports event may be preloaded with content about that event and advertisements intended for that audience. In this example, the content may be provided with no cost, as may the transport, provided the vehicle users watch, and are immutably confirmed as such, the content and advertising during the journey.

IP technology, for example a network access point, can be built into the car and may be utilized (via, e.g., an embedded cellular modem) or brought into the car via a mobile device and then connected to the in-vehicle infotainment system for display on video monitors built into the vehicle, akin to the IP audio streams discussed above. This video content can be from such providers as HULU, VIMEO, YOUTUBE, COX, COMCAST, VERIZON, NETFLIX, HBO, AMAZON PRIME and many others. Other content can be video games (electronic game that involves interaction with a user interface to generate visual feedback on a video screen) or other electronic applications that are either locally stored or are web-based applications including social media platforms such as TWITTER, FACEBOOK and LINKEDIN, chat programs such as SNAPCHAT, office productivity programs such as MICROSOFT EXCEL, POWERPOINT, WORD and the like. This type of video content will be distributed by such companies as NINTENDO, ELECTRONIC ARTS, SONY INTERACTIVE, ACTIVISION BLIZZARD, MICROSOFT, GOOGLE and the like.

To meet industry expectations, there remains a need for an optimum system to be able to continuously provide usage measurement data in real-time and with a high degree of geographic location accuracy. A large sample size, as identified above, is also a pre-requisite of achieving this requirement. Still further, having developed a system and methodology to actually measure the media content, including audio and video that is consumed in a vehicle, there is also a demand for a differentiation between multiple users of the vehicle (e.g. members of the same family). This includes contextual analysis of how media consumption may differ with situation (e.g. a mother or father may primarily listen to adult news and music content during their commute while alone in the car but might listen to a kid's channels whenever their children are in the car). In addition, video delivered via a hybrid ATSC 3.0/cellular network may play different content including advertising to multiple screens in a vehicle recognizing the user of each screen. One aspect of the instant platform can be the recognition of the plural devices in a vehicle, any or all of which may be receiving content delivered across a range of sources, for example via broadcast or broadband internet.

Further still, the instant system and methodology allows for the measurement of data, audio, and video as well as other content delivered to a vehicle. For example, a vehicle can receive a display ad, coupon, cryptographic token, audio, video or other content relating to a fast food restaurant, based upon the devices real-time location data. Using data associated with what is being broadcast/transmitted to the vehicle as well as location data from the system, the instant method and system can determine whether the vehicle took an action, e.g. drove to the store or accessed a website, saved the information for later, etc. This analysis is also known as ad attribution. For example, in some circumstances a vehicle location may be known, through location information being made available to the platform, and in this situation although the identity of the occupants of the vehicle may not be known, the location information may be used to provide advertisements to the occupants of the vehicle, though multiple delivery methods. For example, of the vehicle is an autonomous vehicle, ride share, taxi, Uber Lyft or similar, where the vehicle location is provided by the vehicle to a platform or service operator, then such information may be made available to the platform for the provision of relevant advertisements using that location information.

Comparing the activity of vehicles that viewed/heard an ad to the vehicles that did not view/hear the ad results in the ability to measure video store ad conversion rates, number of store visits, advertising lift and ad cost per store visit. Combining this data with consumer store spending data leads to a value per vehicle visit. Using location data derived from the vehicle, and/or other sources, the system can develop driving patterns, store visit locations, and visited store types which comprise valuable intelligence for retailers. Such intelligence may include, for example, metrics describing the frequency, timing, number and type of visits/ occurrences, repeating patterns, financial and other value exchange, redemptions, purchase analytics and the like. The impact may be measured using a variety of methods such as including both quantitative and qualitative, as are typically employed in analysis of advertising, promotion and marketing campaigns, such as conversion factors, upsell analytics, engagement metrics (such as time in store) and the like which are well known in the art. Over time, visitation trends and macro and micro level events affecting real world behavior can be determined. Combining the vehicle location data with the consumer demographics, mobile devices, and app usage can deliver the most accurate ad targeting capability.

The platform of the instant invention may also be utilized to determine the impact of both advertising messages delivered inside the vehicle (audio, video, display, etc.) or external to a vehicle such as a billboard or other form of out of home advertising. Utilizing the vehicle location data with third part data, relative to billboard location and each billboard content, a more effective analysis can be made of exposure to multiple advertising sources—including billboards—can be achieved.

The platform described herein provides capabilities not currently available through traditional advertising and promotion metric and analysis alone. The use of accurate time and location based relationships coupled with the potential for individual vehicle occupant analytics provides a rich source of data that supports multiple new metrics.

For example, these capabilities can include the use of partial or sparse data sets where only some of the information may be available in the "Clear," that is the information has not been obfuscate or treated in manner that reduces the accuracy of the data. For example, this may include location information where the accuracy of the location is eroded from, 10 m to 1000 m, or the identity of the vehicle is reduced from a VIN number to a type (for example a four door sedan, or SUV rather than a specific Mercedes GLS 300d with VIN 123xyx56789).

In some embodiments, the data normalization module, or normalization operations of the platform, which may be instantiated as a module thereof, may include processes for determining the degree of accuracy of the incoming information. For example, if the location information is of granularity x, for example 1000 m, and then after a period of time becomes granularity y, for example 10 m, then the accuracy of the initial granularity may be marked with an appropriate metric, for example, obscurity is high (or rated on a scalar for 1 to 100, where 100 is high accuracy). Conversely, the locations with the 10 m granularity may be scored with obscurity metrics of low. Locations that can be further validated, for example where the location obscurity metric is low and there is a further confirmation of that location, for example from another device in the vehicle, an external sensor recognizing the vehicle, the mapping of the vehicle to a known location (such as a road) where a number of previous journeys have taken place and the like, then the obscurity metric may be set to zero (where zero is the lowest possible score, and thus reflects accuracy). In addition, other metrics such as accuracy may be used with the information to provide a multi variate set for metrics for an information set. These metrics may be applied to any information that is received by the platform where the accuracy of the information set is variable, for example location, time, identity and identifiers, and/or other information that can be used to identify a specific user, vehicle or device in any arrangement.

These normalization process may be undertaken upon the ingestion of the information, where these metrics are assigned to the information sets as they are ingested or may be applied and/or modified after the information has been received. This may include the use of confirmation information, where for example other sources such as contextual information such as weather, traffic density, roadworks or other factors may be used to vary the initial metrics assigned to the incoming information sets.

Other forms of normalization may include the validation of information sets, such that the metrics representing their accuracy are bound to those information sets, so that when further processing involving machine learning and probability based statistical techniques are applied, the outcomes of which may, in part represent the degree of ground truth of the incoming and normalized information, which in turn may represent the underlying reliability of the information. In this manner the degree of estimation, probability, or other calculations applied to the incoming information may be both visible and expressed in terms of the obscurity and/or accuracy metrics, and/or as a further metric, reliability. This is particularly pertinent where only a single parameter, such as time, is accurate and all the other information that is part of the information set associated with that time has metrics reflecting the degree of obscurity and/or accuracy for that information.

The normalization processing may be used to incorporate the reliability metrics of the incoming information and process that information and the associated metrics into a format suitable for incorporation into at least one repository, which may be coupled to a distributed ledger, such that there is an immutable record in the distributed ledger, for example that information that is determined at ingestion to have the highest degree of accuracy, lowest degree of obscurity and highest degree of reliability, or other equivalent metrics representing the ground truth of the incoming information, may be stored in the distributed ledger and assigned a root identifier, which may be cryptographically signed.

This normalized information may then be further evaluated based on other information sources, such as program logs and the like, such that metrics associated with the information is varied accordingly. In this manner both the immutable nature of information is retained whilst the reliability of the information is represented in light of further information sets.

In essence, an advertiser generally wants to know if their advertisement is effective, and ideally if it led to a sale of the product or service being promoted. Content providers whose business model is built on delivering those advertisement to their audience want to ensure that their audience is of sufficient interest to their advertisers to support their business. This platform supports the traditional advertising metrics used by the industry as described herein, however further introduces metrics which may be created and delivered using unique capabilities of the platform. Those added metrics can include location clustering, event tracking, and vehicle user types, among others.

A location clustering metric can capture each point-of-interest (POI) that may have a number of vehicles that have a relationship with that location. For example, the captured data can include a particular POI that may have a number of vehicles that pass by within a specific timeframe and the number of vehicles that stop at that location for a given period of time. This metric can be defined as the "attraction" of a particular POI. Each vehicle that passes by a given POI, or location, will have some visibility to the vehicle occupants, and in most commercial operations there is sufficient signage to make the vehicle occupants aware of the location—this is termed "location exposure." When a vehicle is stopped at the location, that event may either be the end of a journey or a waypoint on the journey.

An event tracking metric can capture a level of correlation for an advertisement, recommendation, or other promotion has created an event, along the vehicle's journey. For example, when a vehicle stops at a particular POI for sufficient time to undertake a transaction to create an event metric can be created. This event tracking metric may then be used as a seed to represent statistically other vehicles that were influenced by the relevant advertisement, recommendation or other promotion within the classified time period.

Vehicle user type metrics can be described as a segmentation of the vehicle users based on exhibited journey behaviors such as where journey patterns match common journey types, for example morning/evening commute, school run, weekly shopping/sport or another regular journey and the like. Each of these journeys may be classified using machine learning and pattern recognition techniques where common waypoints, as described herein, are repeated within time periods on a regular schedule.

In some cases, this segmentation can be based partially obscured information. For example, journey patterns can be identified based on journey locations that are reduced to postal codes or neighborhoods for journey start and end or can include reduced time resolution (AM/PM instead of specific hour, minutes, seconds). When additional information is made available (for example co-related location or time information from a different source) or additional access is guaranteed this segmentation can be confirmed and its accuracy can be improved.

The uses of journeys as structures for the analysis of date sets received in real or near real time and those received at some later time, provided a simplification capability to create a directly calculated journey information set and/or an inferred/learned information sets which in combination reflect the activity of a vehicle and the occupants thereof with a high degree of accuracy. This journey information sets can include third party data sets, such as weather, maps (including known and discovered points of interest), some of which may form the basic structure for multiple journeys. For example, if a known location is a large campus or factory, and the roads leading to that location are mapped, then a series of journey frameworks may be calculated that lead from known residential areas to those locations. Consequently, the available broadcast stations and content available at specific times can be integrated into that journey framework, as can weather and other time variable events. These frameworks can be used to identify patterns of behaviors of vehicles and their occupants to create quantized information sets, as they are representative of constrained behaviors determined in part by the available options. The machine learning techniques for these pattern formulations can be classified, in part through these journey frameworks, for example a morning or evening commute may be determined in part through the vehicle traveling on a path that has a high probability of having a destination of the known campus, or factory, even if the location information for the last part of that journey is obscured or unavailable. These techniques include, the use of accumulation strategies, where the conditional probabilities of each of each of the information sets is, in port correlated through an adjusted timeline and related to the likely physical location of a vehicle related to a map of the area traversed by the vehicle. For example, the use of Long Short-Term Memory and other gated Recurrent Neural Networks, can provide the means to create patterns of journeys over a sequence of time, for example multiple weeks, which in turn can support the identification of deviations from those patterns, which may be associates with content, for example advertising, delivered to the occupants of a vehicle.

Further analytics may be developed and included, based on patterns derived and detected by machine learning analytics and pattern recognition techniques. These may be complimented by further analytics and metrics created in response to information stakeholders who request such metrics, including those created from reports that stakeholders develop through API access to the platform.

In a first exemplary embodiment use case, location information of a vehicle or set of vehicles may be used to initiate delivery of specific advertisements to that group of vehicles. For example, if a group of vehicles, which can be represented by a single vehicle, a set of vehicles, or a pattern demined to effect at least one vehicle, are known to be stopped in traffic congestion an ad for a fast food, fuel, or other convenience services may be broadcast at the time.

The platform can include a map that has the locations of roads and road infrastructure, such as bridges, tunnels and other potential bottlenecks, where vehicles are likely to be traveling slowly or are stopped. These POI, points of interest, may be associated with a journey as waypoints. In this manner, advertising may be timed to coincide with predictable situations where a mass of uses who are located for a period of time near a POI. For example, a set of vehicles may be converging on a bridge, which at morning or evening commute times causes those vehicles to travel slowly, with frequent stationary periods. In this example, an advertiser may make an offer that corresponds to that location, which could include either immediate or delayed satisfaction. For example, immediate satisfaction may include providing entertainment or content for a user to consume whilst they are stuck in the jam. Delayed satisfaction may include proposing a user circumvent the jam by going to a POI of the advertiser, for example a fast food outlet, fuel outlet and the like. This may have more impact if the advertisement is delivered before the vehicle reaches the jam. The ability to integrate the current and predicted location information for a vehicle into a program of advertising creates new opportunities both in traditional broadcast and internet delivery.

In an additional exemplary embodiment, a set of users may be provided with incentives, or rewards, to load a specific application on their personal electronic devices that provides offers to them based on their location and listening habits. For example, such an application may be aware that a user is listening to a specific radio or television station, and that station, in collaboration with an advertiser may provide an offer to that user based on their location. This may include the use of an API or other service interface that integrates with existing content render applications.

One handicap with existing advertising tracking systems is that users are reticent to provide a third party with detailed geographic location information about their homes or places of business, for example. Thus, the instant platform is concerned with, among other things, the protection of personally identifying information associated with vehicle occupants, where information that is ingested by the platform, by itself or in combination with other commonly available information can identify the specific occupant of the vehicle and/or the specific vehicle, and thus ownership thereof. The various platform embodiments can include one or more configurations to protect the privacy of the vehicle and its occupants, whilst providing detailed analytics for content providers, distributers and their stakeholders.

In an example, a blind signature 210, can provide a method for anonymizing the identifying information of a vehicle, user, and/or location whilst maintaining the integrity and authenticity of the anonymized information. A blind signature 212, can additionally provide a method for anonymizing the identifying information of data provided by third party data sources 220 as well. In this approach, the platform will act as the verifier of the credentials of one or a combination of users, vehicles and/or locations, which may be represented to the platform in a form that cannot be traced back to the underlying identities or locations, and yet yields sufficient information to undertake reliable monitoring of a vehicle, user, and/or device's exposure to, and consumption of, content. The platform can act as the signer of the information providing verification of the underlying information.

When providing an information sets that could directly lead to the accurate identification, by the platform or another third party, of a specific user, device, vehicle and/or information that would enable that information to be found, such as for example regular location such as home or office, a blind signature may be created to ensure that this identifying information is not disclosed. To create a blind signature for this purpose, a user, device, and/or vehicle will have a unique identifier assigned to them. This may be self-generated, assigned by another party (for example an OEM, device manufacturer, the platform, a trusted third party and the like). The identifier, which can be a minimum of 128 digits, is multiplied with a blinding factor, which is a random number generated by a random number generator. The result is then signed by with a private key maintained by user, vehicle and/or device or their trusted proxy. The signed information set can then be communicated to the platform which is configured to access the underlying information set without accessing the sensitive identifying information, such as identity of user, device, vehicle or location.

The treatment of some information that may be available from a vehicle, and the devices of the occupants therein, may be subject to voluntary or regulatory privacy concerns. For example, a user's home location may be considered sensitive by the user, the vehicle manufacturer, or other party. Although the platform has the capability to integrate multiple sets of information from diverse sources, and collate these around a designated identity, some of the information may be encrypted or otherwise obscured such that certain of the identifying information is unavailable.

One exemplary embodiment employs cryptographic blind signatures, where a user, a vehicle, and/or a device in any arrangement, can be assigned an identity by the system. This identity can include a set of credentials which are bound to the software employed by the platform to capture the information of the user, devices and/or vehicle. This information can be segmented into discrete packages, which may be sequential, based on time, network availability, location or other parameters. Some or all of the information collected in these packages, in whole or in part, can be encrypted and the system on receipt of this information signs the package with the system provided identity to validate such information collected is from that user. This collection may be written to a distributed ledger to provide an immutable record.

Figure 2:
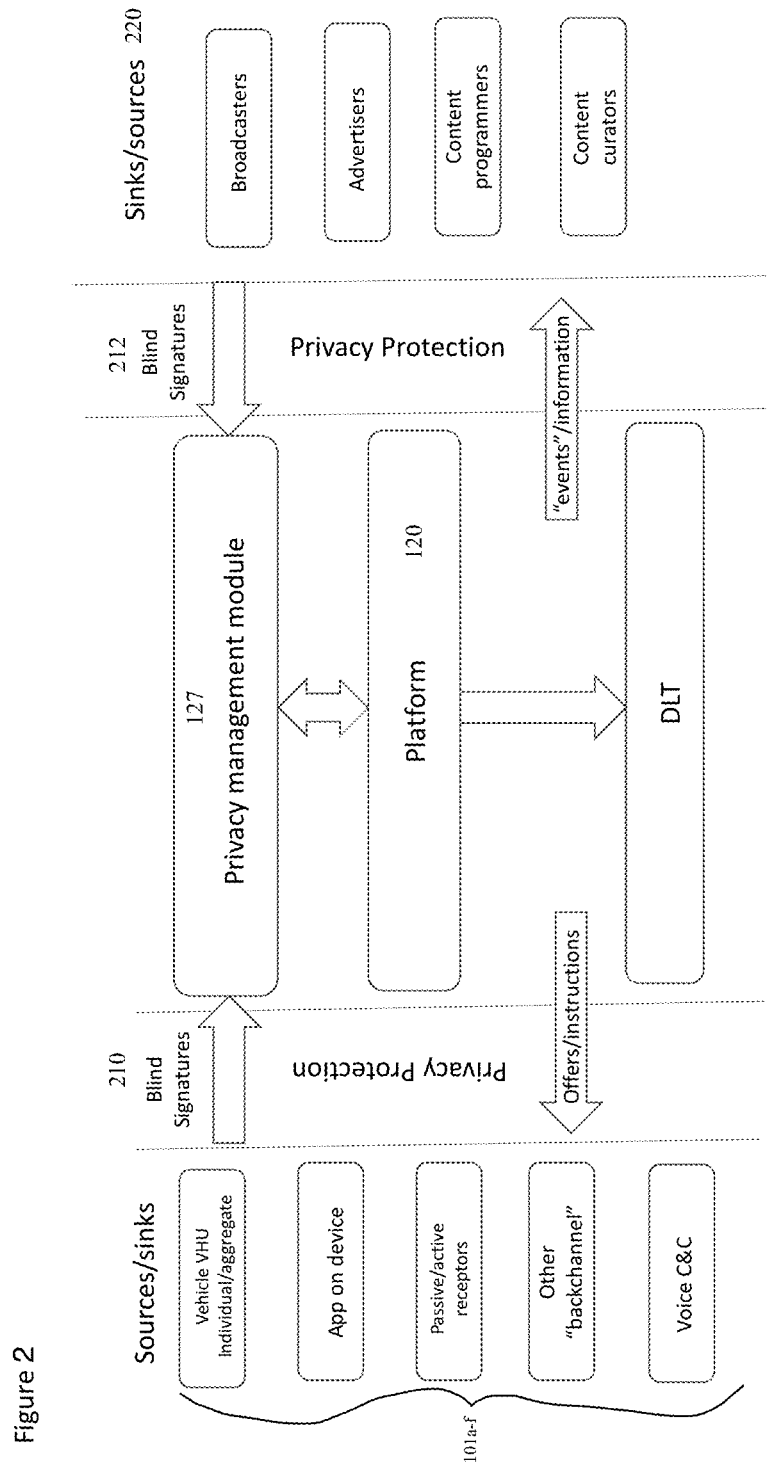
FIG. 2 is a block diagram of a blind signature module of the platform of FIG. 1.

In one example, as shown in FIG. 2, identity information of a user directly or their proxy (the vehicle with which they are bound or associated, their registered device or other verifiable identity proxy) can be "blinded" such that their identity is protected, or signed, by the platform 120, consequently the specific identity of that individual or their proxy is hidden, as discussed above. This may be further extended to include "right to be forgotten" types of regulations or technical specifications, where the information availability is limited and/or deleted in accordance with such regulations or specifications and an audit trail, for example through the use of a distributed ledger, is created to verify such operations. Additionally, or alternatively, an obfuscation function can be applied to the raw data, and can include the subtraction, or omission, of one or more items within a data set (e.g. the use of sparse or excluded data sets), changing the resolution of the items within the data set, or the addition of data within the data set.

Figure 4:
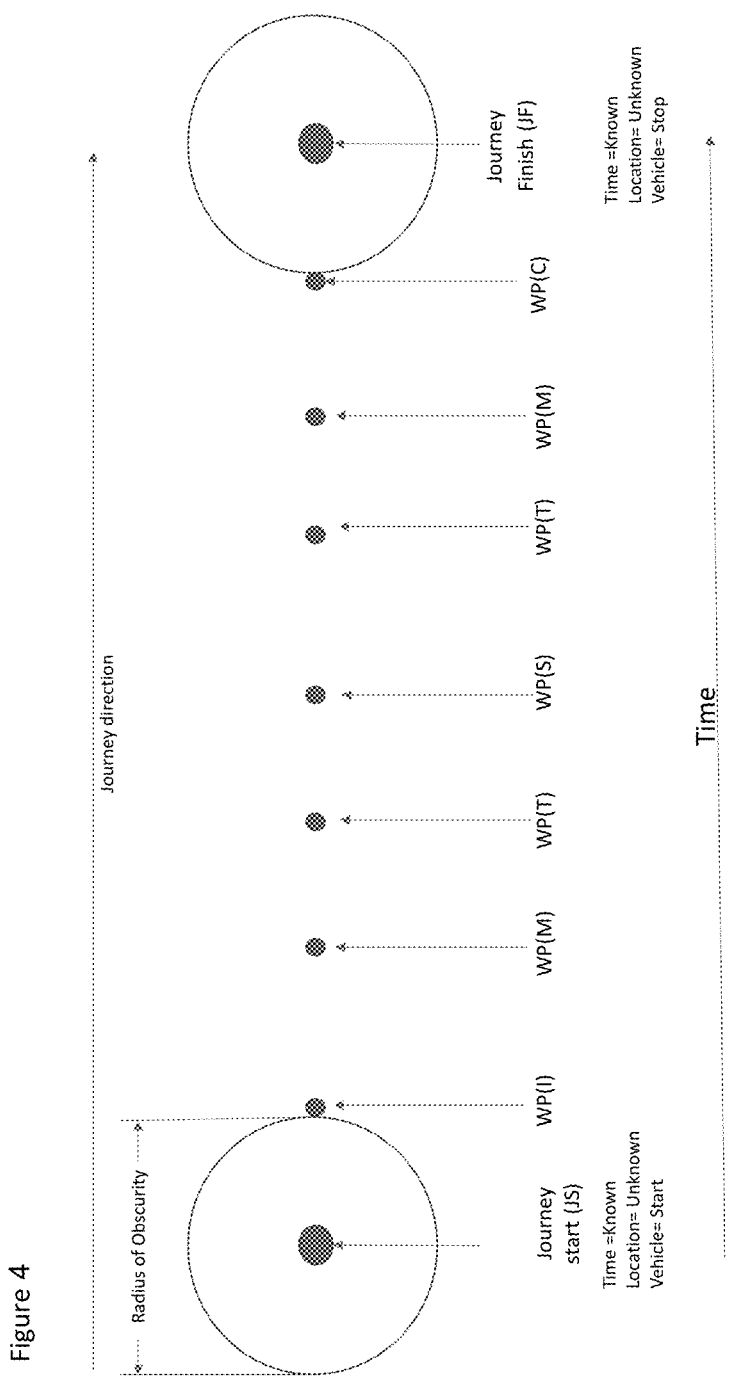
FIG. 4 is a block diagram of a journey and waypoint example.
Figure 5:
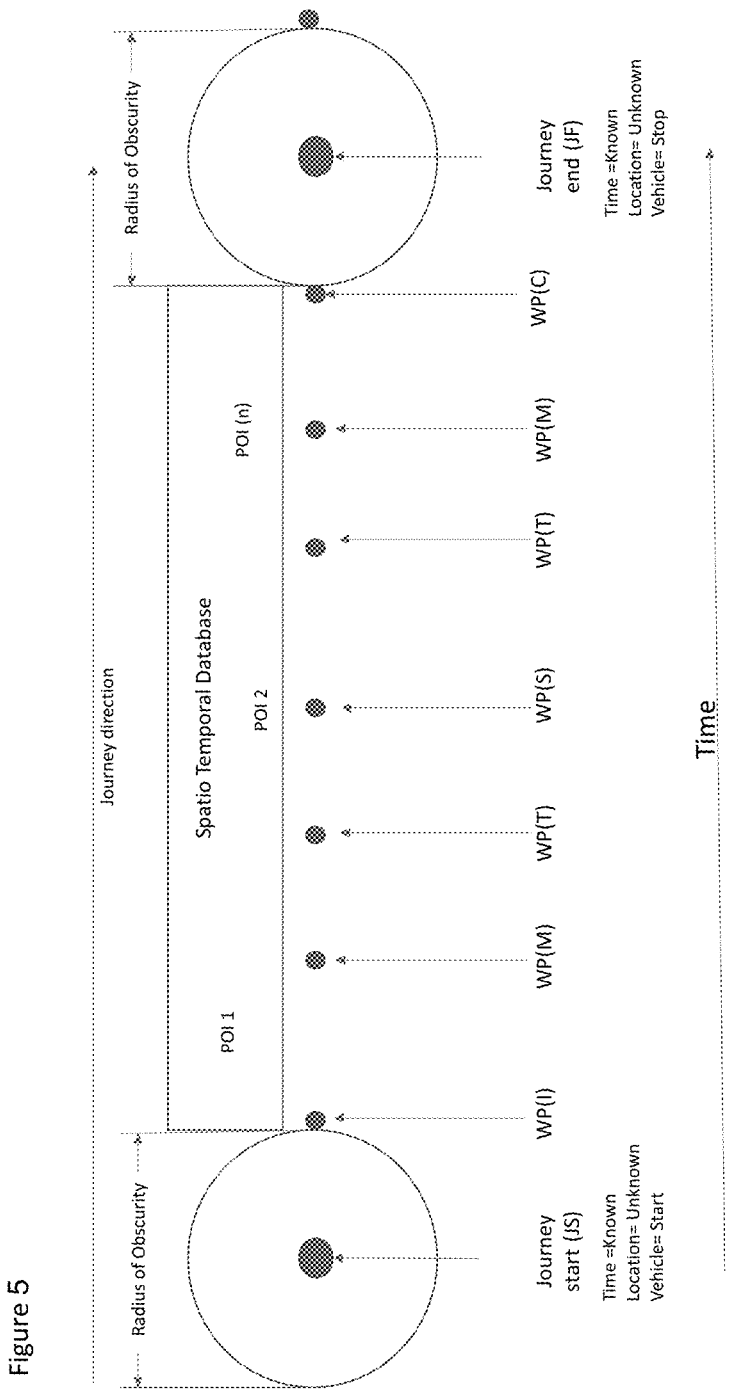
FIG. 5 is a block diagram of a journey and waypoint example tied to a temporal database.

This blinding functionality can include other information sets, such as location information, where that information is regarded as sensitive, such as a user's home location which could be used to identify them, as shown in general in FIGS. 4 and 5. The start and/or end points of a journey may be blinded through a radius of obscurity, such that although the journey location information is generated, it is only when that location information coincides with a point of interest that the location and time of that occurrence becomes available. This can be undertaken within the platform and/or on software resident or bound to the location generating device(s). For example, a device may encrypt all location information sent to the platform using a key generated for each segment of the journey. A segment can be a specific distance traveled, such as 1 km, so that although the location information generated may be accurate to 10 m and consequently that segment information may contain 100 entries, these are all encrypted. The meta data of the segment can include a location, that is the last location before transmission to the platform which is 1 km for the initial position. This metadata can then be compared with a map that includes points of interest. If the vehicle location is within a radius of the point of interest, for example 100 m, then the platform may request a key to access the data in this segment and undertake a matching process to validate the vehicle was at that location. If this is positive, then second set of processes may query the vehicle, or the platform to ascertain the timing of that event, the state of the vehicle (started/stopped) and the occurrence of an advertisement or other content, that is associated with that point of interest. If there is a positive correlation, based on a set or specifications, then an ad attribution event may be created by the platform 120.

In some embodiments, the full sequence of accurate location information may be sent unencrypted, with the rest of the information encrypted, to a platform service configured to determine match, stop, or complete attribution. That way, the attribution (or a critical step towards it) can be associated to the vehicle/user without the need for the platform service to access privacy/security critical information. This applies to matching journey information, including waypoints and POIs or segments of a journey to a route or a pattern, and the like. This may be incorporated in the spatial hierarchies described herein.

This spatial hierarchy may include creating a radius of obscurity for a certain distance from a regular start point of a journey, such as home or work, where the location information resolution is granular to, for example, 2 km^2 in an urban area. Such granulation may correspond to well recognized demographic geographical denotations, such as zip codes and the like. In this example, the location information would remain encrypted. Another approach may involve making the time information unavailable for a pre-determined amount from a vehicle journey start event.

The set of location points that comprise a segment can be hashed to create a segment identifier, which can be used to compare other segments building a model of the behaviors of that vehicle over time, as shown in FIG. 4. For example, a regular commuter, shopping sport or other regular activity journey. The platform may also, using a spatial database create signatures for all the segments of the common routes where many vehicles travel. These may focus on points of interest, such as commercial outlets, schools, office buildings and the like. In this manner the segment signatures may be compared to ascertain the vehicles proximity to the point of interest without disclosure of the specific vehicle and associated identities or detailed location.

In one embodiment, the information from the vehicle may be received, through an encrypted connection, in the clear, and stored in an encrypted format in a platform repository. This information may then be subject to a set of processing that removes, or obscures, the information such that the original information cannot be traced back to the user, vehicle or device from which it originated. This may include purposefully changing the certainty of the location information, through for example increasing differ, jitter or other artifacts of the location information, or reducing the accuracy of the location measurement through reduction of the number of decimal degrees in the location data, for example concatenating form 4 digits, representing an accuracy of approx. 11 m to 2 digits representing approximately 1 kilometer.

In an urban environment this scale of obscurity will likely be adequate; however, a further step may be involved, where the information as a range of possible locations within a circular area, a zip code or other location representation is used for more sparsely populated areas.

Many of the analytics described herein are commonly used by content providers involve the geographical segmentation of an area into markets. These markets are, in part, the result of the historical ability to measure and evaluate an audience for the content provider. In many circumstances, the typical journey of a user in their vehicle is unlikely to move from one market to another and, as such, the measurements and analytics of their content consumption is restricted to that market.

For example, a journey that is taken with a given market can include: a Journey Start (JS); one or a plurality of Waypoints (WP); and/or a Journey Finish (JF). Waypoints may involve three different types: 1) a moving waypoint—where a waypoint is passed by a vehicle and that vehicle is in continuous motion, designated WP(M), FIG. 4, 2) a temporary stop—where a vehicle is temporality halted at a traffic light, stop sign, rail crossing or by other traffic, designated WP(T); and a stop—where a vehicle stops at a specific location for a time period, and at least one of the vehicle doors or windows is opened, designated WP(S).

The temporary stops WP(T) and stops WP(S) may be distinguished through the engine running, whether the transmission placed in park, whether the parking brake applied, whether vehicle doors and/or windows are opened, whether the vehicle infotainment control systems operated, etc. The determination of specific events, such as stopping for shopping, dropping children at school, picking up take away food at a drive in facility and the like can be classified as type of waypoints for the purpose of evaluation of a journey.

A further type of waypoint includes the initial waypoint WP(I), which is the first location information received from a vehicle on a journey. A corresponding waypoint is the final location information received form a vehicle, known as waypoint conclusion WP(C). As such a Journey (J) may be expressed as: J=JS/WP(n), WP(n), WP(n)/JF. Where there may be any number of waypoints WP(n) of any type and one journey start JS and one journey end JF. In the case of a sequence of journeys, time intervals can be determined for the period between a JF and a subsequent JS to determine whether the journeys may be considered individual or not. The evaluation of these information sets may consider both of these outcomes.

FIG. 4 illustrates an example journey and waypoints. In this example, a journey start JS may comprise a set of information, including: Location; Time; and/or a Vehicle identifier. In some embodiments, the location of the journey start JS may be quantized to an area that is within a specific market, but at a granularity that is insufficient to establish an exact location for the vehicle. The vehicle identifier may be a hash or other cryptographic representation of the vehicle identity that does not provide sufficient information to identity that specific vehicle. The time element is accurate and may be further validated against a trusted time source.

The degree of accuracy of the location information may increase once a vehicle has joined a major road artery, and as such the originating location of the vehicle cannot be resolved sufficiently to accurately determine its start point. This may be considered in the journey as a waypoint and may be designated as such, for example WP(MS). In the same manner the final waypoint before a vehicle arrives at a journey end, where such a journey end is a regular occurrence, such as a workplace, may be designated as WP(MF), and from this point forward the location information may not have sufficient granularity to determine the actual final location. Each of these waypoints, WP(MS) and WP(MF) can be compared with Points of Interest (POI) that are maintained by the platform for the market for which the analytics are being produced. These POI include the generally available information provided by mapping systems, such as roads, schools, retail, commercial, hotels, restaurants, churches and other societal gathering places and the like. This information may be overlaid with POI relative to the advertisements, recommendations or other promotional materials that are communicated to the vehicle during the time period being monitored. In this manner, a vehicle journey may be considered as the relationship between the advertising provided at a specific time, the consumption of that information by the occupants of the vehicle and the relevant response of the occupants to that advertisement, such as stopping at a POI associated with that advertisement.

Further, if at another time a vehicle that has been exposed to a number of expressions of that advertisement or promotion, makes a journey to a POI, this may be evaluated and correlated to that advertisement. The platform may maintain a set of vehicle to POI relationships, where the location information is sufficient to identify that the vehicle location and POI location intersected at a specific time, and yet the identity of the journey's start and end of the vehicle were only able to be identified to the degree required to place them in the market being analyzed.

In an exemplary embodiment, a matrix may record the sequences of journey locations (JS, WP(n), JF), which may then be combined into Tensors. Tensors provide a convenient data structure and framework for management, configuration, and operations that can be employed to represent sequences of journey locations with measurements such as the number of times they show up in the data, their frequency, their likelihood given a time of day or day of week, the number of exposures to particular ad content and so on. This makes it easier to use software and hardware that are optimized for matrix calculations in order to find, for example correlations between ad exposure and visits to POIs related to the ad or to find journeys and journey types where the driver is most likely to respond to particular ad (software such as NumPy, TensorFlow, TensorNetwork, hardware such a GPUs).

There are specific timeframes that can be classified by the system that represent the typical vehicle flows for that time period, for example morning and evening commute, school drop off and pick up, shopping runs, weekend sports events and the like. These classifications provide a framework into which vehicle journeys may be grouped. The granularity of location information required for this classification need not be so accurate as to identify a specific vehicle, rather the journey itself is of prime interest, as it is repeated on a regular schedule. Consequently, any deviation from this regular journey that involves a POI that is recorded in the platform repository is an event that is analyzed to identify what advertisements, recommendations or other promotions may have triggered the deviation. This is evaluated in terms of correlation and potentially causation.

A platform spatiotemporal database may include vehicle road layouts that are specified varying degrees of accuracy, including those available from mapping providers, such as GOOGLE, APPLE and the like, and those provided by, for example auto OEMS or other sources. These maps provide a means to resolve the location information received from a vehicle, directly or indirectly, to a road that the vehicle uses. This in turn may be compared with traffic and other contextual information for the time period the vehicle is traversing that road, providing an accurate context for the consumption of content for occupants of the vehicle.

In some embodiments, access to cell routing information and/or 5G access information may be integrated into the location and other information sets managed by the platform. For example, this may include the measurement of the relative strength of radio signals from a cellular of 5G transmission location and use of that information set in determining the location, velocity, direction and other vehicle positional and dynamic information sets.

FIG. 5 illustrates a correlation of Points of Interest (POI), with vehicle location information and associated waypoints. In this example the journey start WP(S) is correlated with POI 2, representing an advertiser that has a relationship with a point of sale for the product/service being advertised. In this example, a vehicle stops at the POI 2 while on a journey. The relationship between a location of a vehicle at a waypoint and a POI may be represented through a circular error, estimated linear distance, line of sight, (such as line of sight, to a POI that can be seen from the vehicle) and other forms of approximation which may be processed by platform to create a confidence metric, which may include location, exposure, time, interaction with point of sale or other metrics for that POI.

In some embodiments, a content provider may be provided a set of information that has been processed by a system that protects the privacy of individual users, including their identity, the identity of their vehicle, the route taken, including the end points (for example home and work). This information set may be presented to a content provider in a form that enables that provider to better target their programming, including any advertisements to those users represented by the information set.

For example, as each traditional (AM/FM or other terrestrial broadcast system) has a specific geographical footprint, the information set may comprise the patterns of user activities within that location footprint. For example, each of the local advertisers may have at least one point of sale within that geographical area, and the information sets may convey the number of users who on a regular basis travel within a certain radius of those locations and at the time periods when that travel occurs. A broadcaster may then provide an incentive, in the form of a promotion, for that set of users to divert from their normal behaviors in response to that promotion. As the system can detect such changes in behavior, this can be conveyed to the broadcaster, potentially in real, or near real time, so that the impact of that promotion may be evaluated.

In a further embodiment, analysis of a user's tune-in and tune-out behavior, of audio and video sources, within the geographical broadcast footprint of a radio broadcaster may be used to identify weak areas of signal reception which may allow the broadcaster to tune and improve its broadcasting system to provide optimized reception for its listeners.

It would be appreciated by those skilled in the art that various changes and modifications can be made to the illustrated embodiments without departing from the spirit of the present invention. All such modifications and changes are intended to be covered by the appended claims.

What is claimed is:

1. A method for measuring and analyzing in vehicle media consumption and user interaction with a vehicle, the method comprising steps of:
   receiving raw data of media and vehicle usage of a vehicle by a platform device, including a start location and an end location of a journey of the vehicle by the user as well as at least one intermediate waypoint location of the vehicle, the platform device including storage, operation controls, a microprocessor, a memory component, I/O inputs and outputs and an operating system installed and running thereon;
   processing the raw data, in real time, with content measurement software operating on the platform device, and attributing the raw data with at least one immutable distributed ledger and anonymizing only the start location and the end location of the journey of the vehicle by redefining the start location or the end location by a radius of obscurity that is an area larger than either of the start location or the end location;
   producing a report with the processed raw data relating to the user interaction with the vehicle and media content; and
   determining a set of consumption and use habits of at least one user from the report;
   wherein the immutable distributed ledger includes a data set that includes at least the local time of the start of the media content or the user interaction with the vehicle; and
   wherein the data set is hashed and bound to the at least one immutable distributed ledger.

2. The method of claim 1, wherein the processed raw data are obfuscated for the purpose of privacy with use of blind signatures by the platform.

3. The method of claim 1, wherein the processed raw data are obfuscated for the purpose of privacy with use of a spatiotemporal database.

4. The method of claim 1, wherein the raw or processed data are bound to a spatiotemporal database.

5. The method of claim 1, further comprising processing the data by analyzing the set of consumption and use habits corresponding to the at least one user and analyzing a set of situational consumption and use habits corresponding to at least one user corresponding to a set of situations.

6. The method of claim 5,
   wherein the set of consumption and use habits may be determined through repeated patterns in event set data stored in at least one immutable distributed ledger.

7. The method of claim 1, wherein the data set comprises an information set which is bound to a reference time and a reference location.

8. The method of claim 7, further comprising normalizing the reference time to conform to a reference time ledger to immutably bind the reference time.

9. The method of claim 7, further comprising normalizing the reference location time to conform to a reference location ledger to immutably bind the reference location.

10. The method of claim 7, wherein the data set further includes at least one unique identifier.

11. The method of claim 1, further comprising determining individual user actions, associating the individual user actions with a respective one of a plurality of users of the vehicle.

12. The method of claim 1, wherein the report is delivered to an original equipment manufacturer of the vehicle.

13. The method of claim 1, wherein the report is delivered to a media content provider.

14. The method of claim 1,
   wherein the media content is at least one advertisement produced by at least one advertiser, and
   wherein the report is delivered to the at least one advertiser.

15. A method for reporting in vehicle media consumption and user interaction with a vehicle, the method comprising steps of:
   receiving raw data of media and vehicle usage of a vehicle by a platform device, including a start location and an end location of a journey of the vehicle by the user as well as at least one intermediate waypoint location of the vehicle, the platform device including storage, operation controls, a microprocessor, a memory component, I/O inputs and outputs and an operating system installed and running thereon;
   processing the raw data, in real time, to apply at least one obfuscation function to anonymize at least a portion of a personally identifiable information including anonymizing only the start location and the end location of the journey of the vehicle by redefining the start location or the end location by a radius of obscurity that is an area larger than either of the start location or the end location; and producing a report with the processed raw data relating to the user interaction with the vehicle and media content.

16. The method of claim 15, wherein the processed raw data are obfuscated with use of blind signatures by the platform.

17. The method of claim 15, wherein the processed raw data are obfuscated with use of a spatiotemporal database.

18. The method of claim 15, further comprising processing the report by analyzing the set of consumption and use habits corresponding to the at least one user and analyzing a set of situational consumption and use habits corresponding to at least one user corresponding to a set of situations.

19. The method of claim 18,
wherein the set of consumption and use habits may be determined through repeated patterns in event set data stored in at least one immutable distributed ledger.

20. The method of claim 18,
wherein the processing the report step includes importing additional data.

21. The method of claim 18,
wherein a user selects at least one variable from the group of time range, format, demographic group, source, or market to filter data in the report, and
wherein a final report with audience metrics is outputted as a function of the filtered data.

* * * * *